United States Patent
Lin

(10) Patent No.: US 9,231,751 B1
(45) Date of Patent: Jan. 5, 2016

(54) CLOCK-DATA RECOVERY CIRCUIT AND METHOD THEREOF

(71) Applicant: REALTEK SEMICONDUCTOR CORPORATION, HsinChu (TW)

(72) Inventor: Chia-Liang Leon Lin, Fremont, CA (US)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/489,846

(22) Filed: Sep. 18, 2014

(51) Int. Cl.
*H04L 7/00* (2006.01)

(52) U.S. Cl.
CPC .................................. *H04L 7/0016* (2013.01)

(58) Field of Classification Search
CPC ..................................................... H04L 7/0016
USPC ................................................................ 375/354
See application file for complete search history.

(56) References Cited

U.S. PATENT DOCUMENTS

| | | | | |
|---|---|---|---|---|
| 5,539,355 A | * | 7/1996 | Nakamura | 329/302 |
| 6,252,536 B1 | * | 6/2001 | Johnson et al. | 341/155 |
| 2005/0093595 A1 | * | 5/2005 | Rhee et al. | 327/158 |
| 2010/0086090 A1 | * | 4/2010 | Lin | 375/354 |

* cited by examiner

*Primary Examiner* — Michael Neff

(74) *Attorney, Agent, or Firm* — Sughrue Mion, PLLC

(57) ABSTRACT

A clock-data recovery circuit includes a variable delay circuit that adjusts timing of a recovered clock by an amount to recover a received data stream at timing corresponding to a maximum opening of an eye pattern of the data stream. The delay timing is adjusted iteratively. The data stream in input to a 2-bit ADC, where the sampled data stream is compared with reference values representative of conditions of the eye pattern, and a result of the comparisons increases or decreases the clock delay according to a relative height of the eye pattern. A method of clock-data recovery uses the recovery circuit.

22 Claims, 4 Drawing Sheets

US 9,231,751 B1

CLOCK-DATA RECOVERY CIRCUIT AND METHOD THEREOF

BACKGROUND OF THE INVENTION

1. Field of the Invention

The present invention generally relates to clock-data recovery.

2. Description of Related Art

Persons of ordinary skill in the art understand terms and basic concepts related to microelectronics that are used in this disclosure, such as "signal," "clock," "square wave," "edge (of clock)," "binary data," "vertical eye opening," "binary phase detector," "loop filter," "voltage-controlled oscillator," "ADC (analog-to-digital converter)," "inverter," "delay-lock loop," and "clock recovery." Terms and basic concepts like these are apparent to those of ordinary skill in the art and thus will not be explained in detail here.

A clock-data recovery circuit is a circuit that receives a received signal, which carries a stream of serial binary data, and establishes a recovered clock that is aligned with a timing of the received signal. An exemplary waveform of a prior art clock-data recovery circuit, as observed by using an oscilloscope, is shown in FIG. 1A. The received signal, when observed using an oscilloscope, exhibits an "eye pattern". The recovered clock is represented as a square wave with a first edge (i.e., rising edge) aligned with a data transition of the received signal (e.g., edges 101, 103, 105, 107, and 109) and a second edge (i.e., falling edge) aligned with a center of the serial binary data carried by the received signal (e.g., edges 102, 104, 106, and 108). Once the recovered clock is properly established, the serial binary data can be detected by sampling the received signal using the second edge of the recovered clock. A principal of clock-data recovery is well known in prior art and thus not described in detail here.

The prior art clock-data recovery circuit works well if the received signal exhibits a symmetrical eye pattern. However, sometimes, the received signal exhibits a nonsymmetrical eye pattern, as shown in FIG. 1B. In such a situation, the second edge 112 will not be perfectly aligned with the optimal sampling instant 113 where the received signal has the maximum "vertical eye opening" when the first edge 111 is aligned with the transition of the data carried by the received signal.

What is desired is a clock-data recovery circuit that establishes a clock with an edge that is aligned with the optimal timing where the received signal has a maximum "vertical eye opening."

BRIEF SUMMARY OF THE INVENTION

The present invention is a circuit for data clock recovery and uses a method for estimating timing of a vertical eye opening of a received signal at maximum height.

The present invention improves performance of a clock-recovery circuit by adjusting a phase of a recovered clock in accordance with an estimate of a vertical eye opening of a received signal.

The present invention adjusts a phase of a recovered clock to align with an optimal timing where a vertical eye opening of the received signal is maximum.

In an exemplary embodiment, a circuit comprises: a variable delay circuit receiving a recovered clock and outputting a calibrated clock in accordance with a control code; a two-bit ADC (analog-to-digital converter) converting a received signal into two-bit data in accordance with a timing of the calibrated clock; and a vertical eye monitor circuit receiving the two-bit data and outputting the control code, wherein a timing of the recovered clock is approximately aligned with a transition portion of serial binary data carried by the received signal. In an embodiment, the vertical eye monitor circuit establishes an estimate of a vertical eye opening of the received signal based on statistics of the two-bit data, and adjusts the control code in accordance with a sign of a change of the estimate of the vertical eye opening of the received signal in response to a previous change of the control code.

In an exemplary embodiment, a method comprises: receiving a received signal; receiving a recovered clock, wherein a timing of the recovered clock is aligned with a transition of a binary data stream carried by the received signal; establishing a calibrated clock by delaying the recovered clock by a delay controlled by a control code; converting the received signal using a two-bit analog-to-digital converter into two-bit data in accordance with a timing of the calibrated clock; estimating timing of a maximum of a vertical eye opening of the received signal based on statistics of the two-bit data; and adjusting the control code in accordance with a direction of a change of the estimate of the vertical eye opening of the received signal in response to a previous change of the control code.

DETAILED DESCRIPTION OF THE INVENTION

The present invention relates to clock-data recovery. While the specification describes several example embodiments of the invention considered as favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the invention.

Figure 1A:
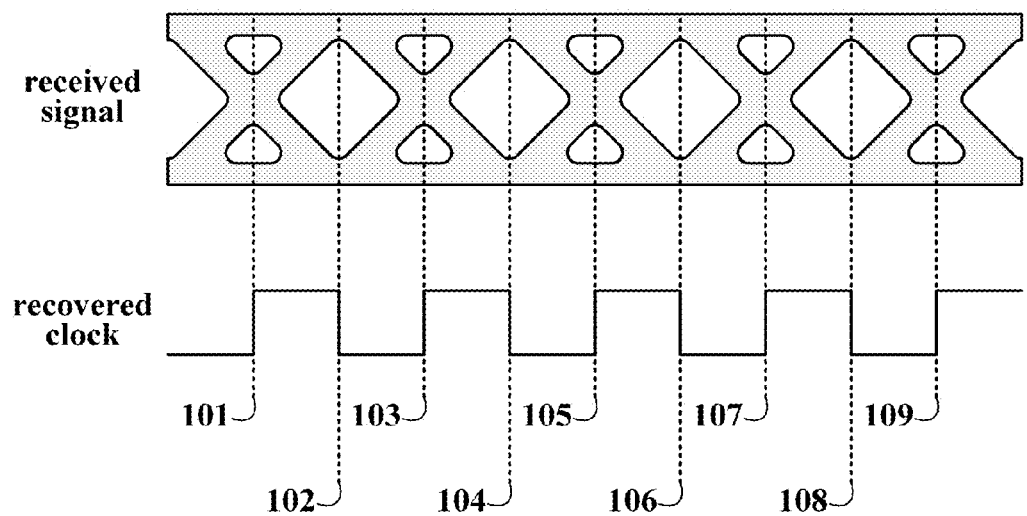
FIG. 1A shows an exemplary waveform of a prior art clock-data recovery circuit.
Figure 1B:
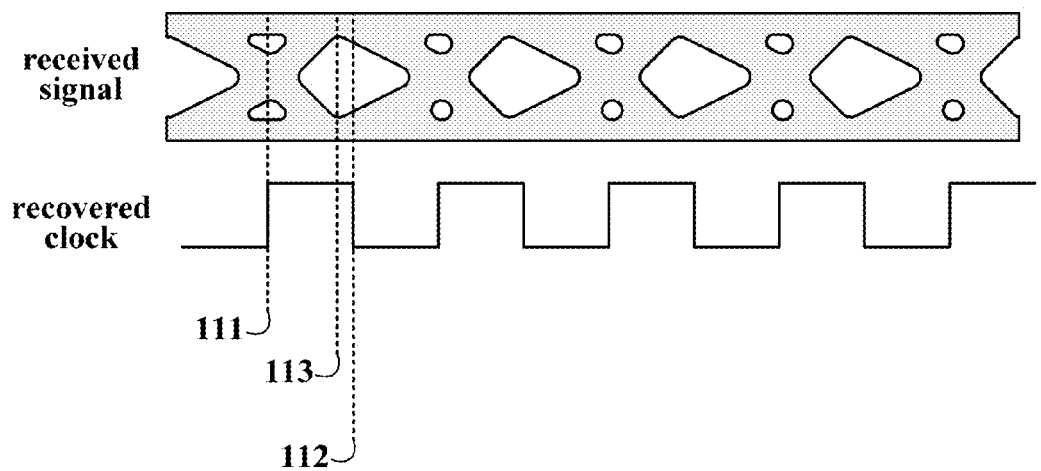
FIG. 1B shows another exemplary waveform of a prior art clock-data recovery circuit.
Figure 2:
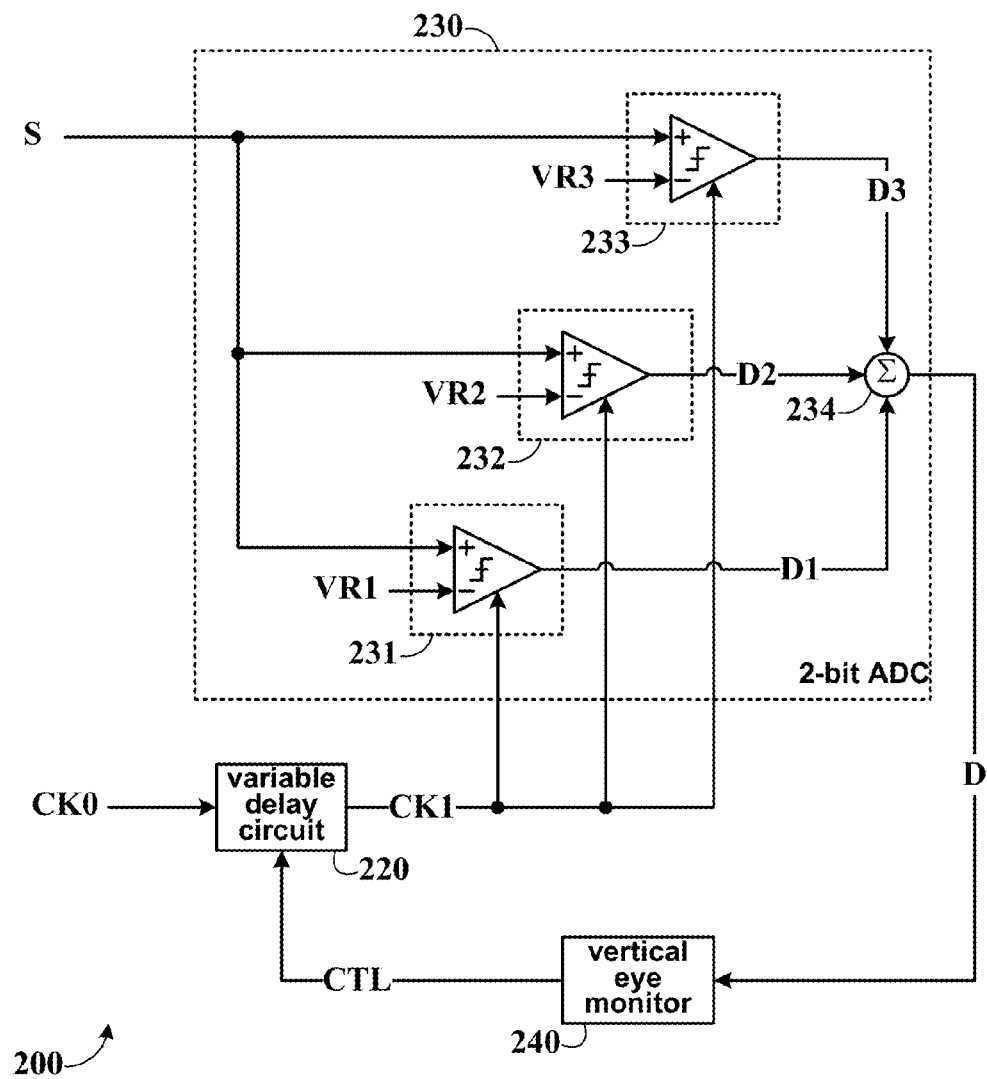
FIG. 2 shows a schematic diagram of a clock-data recovery circuit in accordance with an embodiment of the present invention.

A schematic diagram of a clock-data recovery circuit 200 in accordance with an embodiment of the present invention is shown in FIG. 2. Clock-data recovery circuit 200 receives a received signal S and a recovered clock CK0, wherein an edge (e.g., rising edge) of the recovered clock CK0 is aligned with a transition of a serial binary data stream carried by the received signal S. Clock-data recovery circuit 200 comprises: a variable-delay circuit 220 receiving the recovered clock CK0 and outputting a calibrated clock CK1. The calibrated clock CK1 comprises the recovered clock CK0 delayed by a timing controlled by a control code CTL. A 2-bit ADC (analog-to-digital converter) 230 receives the received signal S and outputs 2-bit data D, in accordance with a timing of the calibrated clock CK1. A vertical eye monitor circuit 240 receives the 2-bit data D and outputs the control code CTL. The control code CTL is established in a closed-loop manner so that the timing of the calibrated clock CK1 is aligned with an optimal timing for sampling the received signal S where a vertical eye opening of the received signal S is greatest. The operation of an exemplary embodiment of the present invention is described in paragraphs that follow.

Figure 3:
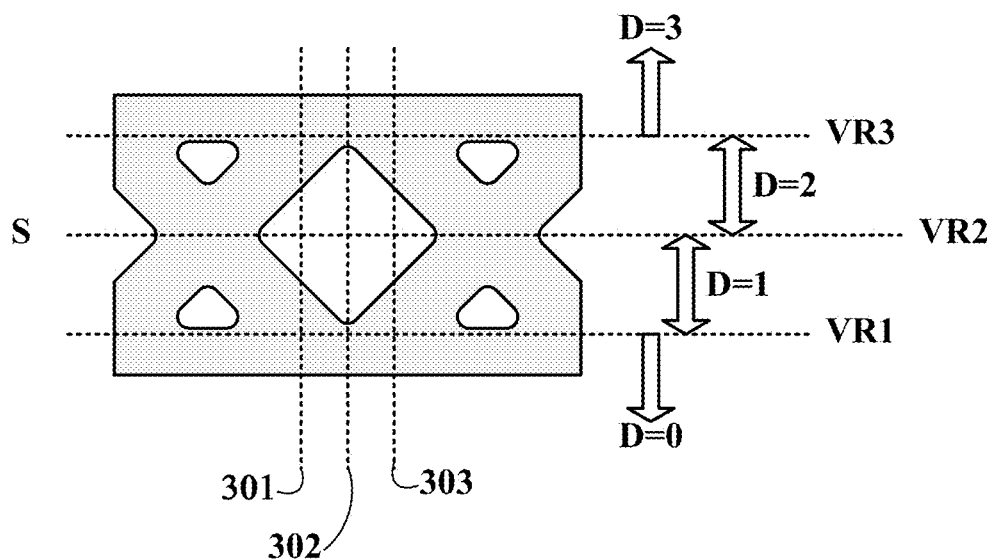
FIG. 3 shows an exemplary waveform of the clock-data recovery circuit of FIG. 2.

An exemplary waveform for the 2-bit ADC 230 of FIG. 2 is shown in FIG. 3. The 2-bit ADC 230 outputs the 2-bit data D by comparing the received signal S with three approximately evenly spaced levels: VR1, VR2, and VR3, in comparators 231, 232 and 233, respectively. VR2 is approximately equal to a mean of the received signal S, VR1 is lower than VR2, VR3 is higher than VR2, and a difference between VR2 and VR1 is approximately equal to a difference between VR3 and VR2. If S is found to be lower than VR1, D is set to 0 (00); if S is found to be higher than VR1 but lower than VR2, D is set to 1 (01); if S is found to be higher than VR2 but lower than VR3, D is set to 2 (10); otherwise, D is set to 3 (11). One skilled in the art would understand how to employ a logical processor and/or logic gates to implement the input and outputs described. VR2 is a level that is known a priori, while the difference between VR2 and VR1 (which is approximately equal to the difference between VR3 and VR2) is set so that a majority of samples of D will be either 0 or 3 when the timing of the calibrated clock CK1 is close to being optimal. When the timing of the calibrated clock CK1 is aligned with the optimal timing instant 302 where the vertical eye opening of the received signal S is greatest, the probability of D being 0 or 3 will be maximum. When the timing of the calibrated clock CK1 is displaced from the optimal timing instant 302, either pulled earlier (e.g., at timing instant 301) or pushed later (e.g., at timing instant 303), the probability of D being 0 or 3 will be reduced. Therefore, the probability of D being 0 or 3 can serve as an estimate of the timing of the vertical eye opening at its maximum. The vertical eye monitor circuit 240 uses statistics of D to estimate the vertical eye opening of the received signal S, and adapts the control code CTL accordingly to align the timing of the calibrated clock CK1 with the optimal timing where the vertical eye opening of the received signal S is maximum and the 2-bit data D is most likely to be assigned a value of either 0 or 3.

Figure 4:
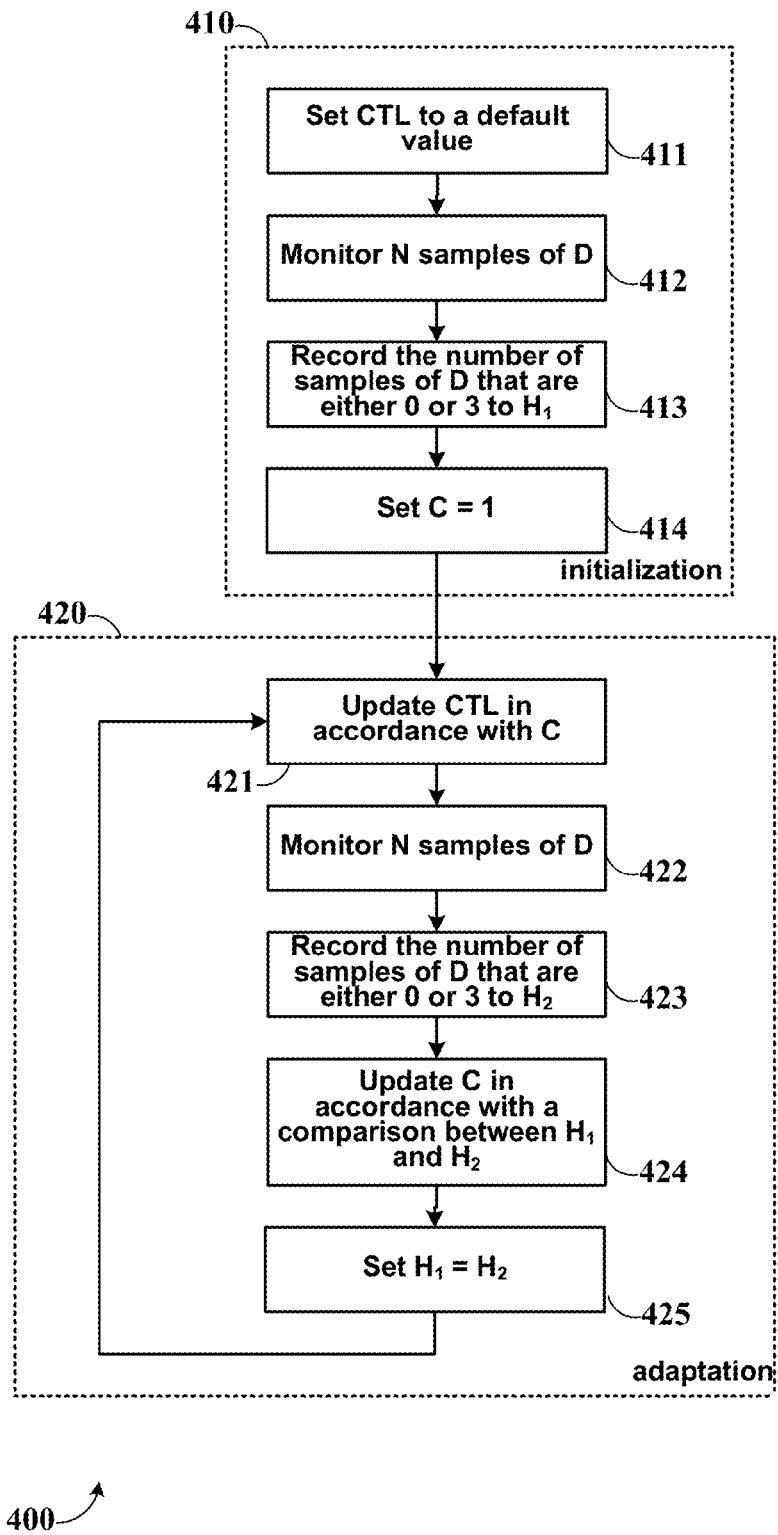
FIG. 4 shows a flow diagram of a vertical eye monitor circuit within the clock-data recovery circuit of FIG. 2.

In an embodiment, the vertical eye monitor circuit 240 is a finite state machine illustrated by the flow diagram 400 of FIG. 4. The vertical eye monitor circuit 240 comprises an initialization state 410 and an adaptation state 420. In the initialization state 410, the vertical eye monitor circuit 240 goes through the following steps: set CTL to a default value (step 411); monitor N samples of the 2-bit data D (where N is an integer that is sufficiently large for a reliable statistics; e.g., $N=2^{20}$) (step 412); record the number of samples of D that are either 0 or 3 to a first internal variable $H_1$ (step 413); and set an internal flag C to 1 (step 414). In the adaptation state 420, the vertical eye monitor circuit 240 goes through the following steps: update the control code CTL in accordance with the internal flag C—increment CTL if C is 1 or else decrement CTL (step 421); monitor N samples of the 2-bit data D (step 422); record the number of samples of D that are either 0 or 3 to a second internal variable $H_2$ (step 423); update the internal flag C in accordance with a comparison between $H_1$ and $H_2$—keep the internal flag C unchanged if $H_2$ is greater than $H_1$ or else reverse the internal flag C (step 424); save the value of $H_2$ into $H_1$ (step 424); and loop back to step 421. In step 424, if $H_2$ is greater than $H_1$, it indicates that the previous change of CTL leads to a greater vertical eye opening, and thus the previous change of CTL is in the correct direction and the next change of CTL needs to be in the same direction. Otherwise, if $H_2$ is not greater than $H_1$, this indicates that the previous change of CTL does not lead to a greater vertical eye opening, and thus the previous change of CTL is not in the correct direction and the next change of CTL needs to be in the opposite direction. In this manner, CTL is updated in a closed-loop manner to maximize the number of samples of D that are either 0 or 3, and thus maximize the vertical eye opening.

Referring back to FIG. 2. The 2-bit ADC 230 comprises: three comparators 231, 232, and 233, for outputting three binary data D1, D2, and D3, by comparing the received signal S with the three levels VR1, VR2, and VR3, respectively, in accordance with a timing of the calibrated clock CK1. An adder 234 outputs the 2-bit data D by adding the three binary data D1, D2, and D3. The 2-bit ADC 230 is often referred to as a two-bit "flash ADC" which is conventionally known to those of ordinary skill in the art and thus not described in detail here. Comparators 231, 232, and 233 can be embodied by comparator circuits that are conventionally known to those of ordinary skill in the art and thus not described in detail here. After the calibrated clock CK1 is properly established, the binary data D2 is the recovered data for the serial binary data stream carried by the receive signal.

An optional inverter can be placed prior to the input of the delay circuit 220, embodied by inverter circuits that are conventionally known to those of ordinary skill in the art and thus not described in detail here.

The variable delay circuit 220 can be embodied by variable delay circuits that are conventionally known to those of ordinary skill in the art (for instance, a multi-phase delay lock loop, wherein the control code CTL specifies a phase to be tapped), and thus not described in detail here. In an embodiment, an increment of the control code CTL leads to an increase of a delay of the calibrated clock CK1, and a decrement of the control code CTL leads to a decrease of the delay of the calibrated clock CK1.

Note that the timing of the recovered clock CK0 is approximately aligned with a transition of the serial binary data stream carried by the received signal S; the recovered clock CK0 can be established by using clock recovery methods that are conventionally known to those of ordinary skill in the art (e.g., using a clock recovery circuit comprising: a binary phase detector, a loop filter, and a voltage-controlled oscillator). As far as the present invention is concerned, the condition is a given and not part of the present invention.

In practice, an optimal value of the control code CTL does not change very often during operation. Therefore, the control code CTL does not need to be updated very often. In an embodiment not shown in FIG. 4 but will be clear to those of ordinary skill in the art simply using written descriptions, the vertical eye monitor circuit 240 can work in an intermittent manner, wherein the vertical eye monitor 240 enters a low-power standby state for a period of time after it exits step 425 and before it loops back to step 421. During the standby state, the control code CTL is frozen, and the vertical eye monitor circuit 240 is idle to save power. The vertical eye monitor circuit 240 returns to the adaptation state 420 after the period of time expires. In one embodiment, during the period of time when the vertical eye monitor 240 is in the low-power standby state, the 2-bit ADC 230 is also powered down to save power. In another embodiment, during the period of time where the vertical eye monitor circuit 240 is in the low-power standby state, the 2-bit ADC 230 is used for other purposes, for instance, for adapting an equalizer circuit (including a variable gain amplifier) that outputs the received signal S. Using a 2-bit ADC to adapt an adaptive equalizer circuit (including the variable gain amplifier) is known to those of ordinary skill in the art and thus not described in detail here. It is workable to let the adaptive equalizer circuit and the vertical eye monitor circuit 240 take turns using a common 2-bit ADC (i.e. 2-bit ADC 230) because neither the adaptive equalizer nor the variable delay circuit 220 needs to be adapted very often.

However, it must be noted that, when using the 2-bit ADC 230 for the adaptation of the adaptive equalizer (including the variable gain amplifier), VR1 needs to be set to a target level of the received signal S for the case when the binary data stream that the received signal S carries is "0" and VR3 needs to be set to a target level of the received signal S for the case when the binary data stream that the received signal carries is "1." In other words, the level of VR1 when the 2-bit ADC 230 is used for the adaptation of the adaptive equalizer is different from the level of VR1 when the 2-bit ADC 230 is used by the vertical eye monitor circuit 240 for adjusting the timing of the calibrated clock CK1. The level of VR3 when the 2-bit ADC 230 is used for the adaptation of the adaptive equalizer is different from the level of VR3 when the 2-bit ADC 230 is used by the vertical eye monitor circuit 240 for adjusting the timing of the calibrated clock CK1. By way of example but not limitation, VR1 is set to −200 mV, VR2 is set to 0V, and VR3 is set to 200 mV when the 2-bit ADC 230 is used by the vertical eye monitor circuit 240 for adjusting the timing of the calibrated clock CK1. VR1 is set to −300 mV, VR2 is set to 0V, and VR3 is set to 300 mV when the 2-bit ADC 230 is used for the adaptation of the adaptive equalizer. Using these settings, the received signal S can be equalized to approximately either −300 mV or 300 mV (depending on whether the serial data stream carried by the received signal is "0" or "1"), and a majority of samples of the received signal S are either below −250 mV or above 250 mV.

Those skilled in the art will readily observe that numerous modifications and alterations of the device and method may be made while retaining the teachings of the invention. Accordingly, the invention should be construed according to the appended claims.

What is claimed is:

1. A circuit comprising:
   a variable delay circuit receiving a recovered clock and outputting a calibrated clock in accordance with a control code;
   a two-bit analog-to-digital converter for converting a received signal into two-bit data in accordance with a timing of the calibrated clock; and
   a vertical eye monitor circuit receiving the two-bit data and outputting the control code, wherein the timing of the recovered clock is approximately aligned with a transition portion of serial binary data carried by the received signal.

2. The circuit of claim 1, wherein the vertical eye monitor establishes an estimate of a vertical eye opening of the received signal based on statistics of the two-bit data, and adjusts the control code in accordance with a direction of a change of an estimate of the vertical eye opening in response to a previous change of the control code.

3. The circuit of claim 2, wherein the estimate of the vertical eye opening is based on counting a number of samples of the two-bit data that are equal to either an upper bound or a lower bound of values for the two-bit data.

4. The circuit of claim 3, wherein the vertical eye monitor increments the control code if one the following two conditions holds: (1) the previous change to the control code was an increment and it led to an increase of the estimate of the vertical eye opening; (2) the previous change to the control code was a decrement and it led to a decrease of the estimate of the vertical eye opening.

5. The circuit of claim 4, wherein the vertical eye monitor decrements the control code if one the following two conditions holds: (1) the previous change to the control code was an increment and it led to a decrease of the estimate of the vertical eye opening; (2) the previous change to the control code was a decrement and it led to an increase of the estimate of the vertical eye opening.

6. The circuit of claim 1, wherein the two-bit analog-to-digital converter comprises three comparators comparing the received signal with a first level, a second level, and a third level, and outputting a first binary data, a second binary data, and a third binary data, respectively.

7. The circuit of claim 6, wherein the second level is approximately equal to a mean value of the received signal.

8. The circuit of claim 7, wherein the second level is higher than the first level but lower than the third level, and a difference between the second level and the first level is approximately equal to a difference between the third level and the second level.

9. The circuit of claim 8, wherein the first level and the third level are set such that a majority of samples of the received signal are either below the first level or above the third level at an optimal sampling instant where the received signal has a maximum vertical eye opening.

10. The circuit of claim 9, wherein the vertical eye monitor circuit works in an intermittent manner and routinely enters a low-power standby state to save power while the control code is frozen.

11. A method comprising:
    receiving a received signal;
    receiving a recovered clock, wherein a timing of the recovered clock is approximately aligned with a transition of a binary data stream carried by the received signal;
    establishing a calibrated clock by delaying the recovered clock by a variable delay circuit controlled by a control code;
    converting the received signal using a two-bit analog-to-digital converter into two-bit data in accordance with a timing of the calibrated clock;
    establishing an estimate of a vertical eye opening of the received signal based on statistics of the two-bit data accumulated in a vertical eye monitor processing circuit; and
    adjusting the control code in the vertical eye monitor processing circuit in accordance with a direction of a change of the estimate of the vertical eye opening of the received signal in response to a previous change of the control code.

12. The method of claim 11, wherein the estimate of the vertical eye opening is based on counting a number of samples of the two-bit data that are equal to either an upper bound or a lower bound of values for the two-bit data.

13. The method of claim 12, wherein the control code is incremented if one the following two conditions holds: (1) the previous change to the control code was an increment and it led to an increase of the estimate of the vertical eye opening; (2) the previous change to the control code was a decrement and it led to a decrease of the estimate of the vertical eye opening.

14. The method of claim 13, wherein the control code is decremented if one the following two conditions holds: (1) the previous change to the control code was an increment and it led to a decrease of the estimate of the vertical eye opening; (2) the previous change to the control code was a decrement and it led to an increase of the estimate of the vertical eye opening.

15. The method of claim 14, wherein the two-bit analog-to-digital converter comprises three comparators comparing the received signal with a first level, a second level, and a third level, and outputting a first binary data, a second binary data, and a third binary data, respectively.

16. The method of claim 15, wherein the second level is approximately equal to a mean value of the received signal.

17. The method of claim 16, wherein the second level is higher than the first level but lower than the third level, and a difference between the second level and the first level is approximately equal to a difference between the third level and the second level.

18. The method of claim 17, wherein the first level and the third level are set such that a majority of samples of the received signal are either below the first level or above the third level at an optimal sampling instant where the received signal has a maximum vertical eye opening.

19. The method of claim 18 further comprising: entering the vertical eye monitor processing circuit into a low-power standby state after adjusting the control code.

20. The method of claim 19, wherein during the low-power standby state, the control code is frozen, the estimate of the vertical eye opening of the received signal is halted, and the two-bit analog-to-digital converter is released and configured for other purpose than for establishing the estimate of the vertical eye opening of the received signal.

21. The method of claim 20, wherein during the low-power standby state, the two-bit analog-to-digital converter is used for adaptive equalizer output of the received signal.

22. The method of claim 21, wherein during the low-power standby state, the first level is lowered and the third level is raised.

* * * * *